(12) United States Patent
Clarke

(10) Patent No.: US 11,921,006 B2
(45) Date of Patent: Mar. 5, 2024

(54) ROBOTIC DEVICE TEST STATION AND METHODS

(71) Applicant: Ocado Innovation Limited, Hatfield Herts (GB)

(72) Inventor: Paul Clarke, Hatfield (GB)

(73) Assignee: OCADO INNOVATION LIMITED, Hatfield Herts (GB)

( * ) Notice: Subject to any disclaimer, the term of this patent is extended or adjusted under 35 U.S.C. 154(b) by 312 days.

(21) Appl. No.: 17/416,908

(22) PCT Filed: Dec. 23, 2019

(86) PCT No.: PCT/EP2019/086924
§ 371 (c)(1),
(2) Date: Jun. 21, 2021

(87) PCT Pub. No.: WO2020/128093
PCT Pub. Date: Jun. 25, 2020

(65) Prior Publication Data
US 2022/0050020 A1    Feb. 17, 2022

(30) Foreign Application Priority Data
Dec. 21, 2018 (GB) ........................... 1821130

(51) Int. Cl.
*G01M 17/007* (2006.01)
*G01M 17/013* (2006.01)

(52) U.S. Cl.
CPC ...... *G01M 17/0072* (2013.01); *G01M 17/013* (2013.01)

(58) Field of Classification Search
CPC ........... G01M 17/0072; G01M 17/013; G01M 99/005; G01M 17/0074
See application file for complete search history.

(56) References Cited

U.S. PATENT DOCUMENTS

| 2,701,065 | A |   | 2/1955  | Bertel |
|-----------|---|---|---------|--------|
| 5,111,685 | A | * | 5/1992  | Langer .............. G01M 17/0074 73/118.01 |
| 6,360,591 | B1 |   | 3/2002  | Carley |
| 6,654,662 | B1 |   | 11/2003 | Hognaland |
| 9,815,633 | B1 |   | 11/2017 | Kisser et al. |

(Continued)

FOREIGN PATENT DOCUMENTS

| CN | 205209782 U   | 5/2016 |
|----|---------------|--------|
| DE | 102015001364 A1 | 8/2015 |

(Continued)

OTHER PUBLICATIONS

Office Action (Request for the Submission of an Opinion) dated Dec. 23, 2022, by the Korean Patent Office in corresponding Korean Patent Application No. 10-2021-7022122, and an English Translation of the Office Action. (9 pages).

(Continued)

*Primary Examiner* — Eric S. McCall
*Assistant Examiner* — Timothy P Graves
(74) *Attorney, Agent, or Firm* — BUCHANAN INGERSOLL & ROONEY PC

(57) ABSTRACT

An automated picking system robotic device testing station having rollers for engagement with the wheels of a robotic device; and a controller to vary the rotation of the rollers.

10 Claims, 13 Drawing Sheets

(56) References Cited

U.S. PATENT DOCUMENTS

| | | |
|---|---|---|
| 10,000,337 B2 | 6/2018 | Lindbo et al. |
| 10,577,178 B2 | 3/2020 | Lindbo et al. |
| 10,829,302 B2 | 11/2020 | Lindbo et al. |
| 10,836,577 B2 | 11/2020 | Fryer et al. |
| 10,913,602 B2 | 2/2021 | Lindbo et al. |
| 10,961,051 B1 | 3/2021 | Lindbo et al. |
| 2005/0028584 A1 | 2/2005 | Barnes et al. |
| 2009/0319200 A1 | 12/2009 | Satonaka et al. |
| 2016/0194151 A1 | 7/2016 | Lindbo et al. |
| 2017/0191902 A1 | 7/2017 | Komada et al. |
| 2018/0178980 A1 | 6/2018 | Lindbo et al. |
| 2018/0178981 A1 | 6/2018 | Lindbo et al. |
| 2018/0194571 A1 | 7/2018 | Fryer et al. |
| 2020/0307908 A1 | 10/2020 | Lindbo et al. |
| 2021/0047111 A1 | 2/2021 | Lindbo et al. |
| 2021/0086992 A1 | 3/2021 | Lindbo et al. |
| 2021/0086993 A1 | 3/2021 | Lindbo et al. |
| 2021/0101743 A1 | 4/2021 | Fryer et al. |

FOREIGN PATENT DOCUMENTS

| | | | | |
|---|---|---|---|---|
| EP | 0767113 B1 | 7/2002 | | |
| EP | 1037828 B1 | 9/2003 | | |
| GB | 2309784 A | 8/1997 | | |
| GB | 2520104 A | 5/2015 | | |
| GB | 2525309 A | * 10/2015 | ............ | B08B 1/002 |
| GB | 2525309 A | 10/2015 | | |
| GB | 2539562 A | 12/2016 | | |
| JP | H6-26997 A | 2/1994 | | |
| JP | 2008101993 A | 5/2008 | | |
| JP | 2009287946 A | 12/2009 | | |
| JP | 2009293988 A | 12/2009 | | |
| JP | 2017509564 A | 4/2017 | | |
| KR | 10-2012-0100279 A | 9/2012 | | |
| NO | 317366 B1 | 10/2004 | | |
| WO | 0165226 A1 | 9/2001 | | |
| WO | 2015140216 A1 | 9/2015 | | |

OTHER PUBLICATIONS

Office Action (Examination Report No. 1) dated Apr. 7, 2022, by the Australian Patent Office in corresponding Australian Patent Application No. 2019400865. (2 pages).

First Office Action) dated Jun. 14, 2022, by the Japanese Patent Office in corresponding Japanese Patent Application No. 2021-536220, and an English Translation of the Office Action. (8 pages).

Office Action dated Oct. 17, 2022, by the Canadian Patent Office in corresponding Canadian Patent pplication No. 3,124,207. (6 pages).

International Search Report (PCT/ISA/210) and Written Opinion (PCT/ISA/237) dated Apr. 3, 2020, by the European Patent Office as the International Searching Authority for International Application No. PCT/EP2019/086924.

Search Report for GB 1821130.0 dated Aug. 21, 2019 (4 pages).

Office Action (The First Office Action) dated Feb. 12, 2023, by the State Intellectual Property Office of People's Republic of China in corresponding Chinese Patent Application No. 201980084996.X and an English translation of the Office Action. (19 pages).

Office Action (Examination report No. 2 for standard patent application) dated Nov. 8, 2022, by the Australian Government, IP Australia in corresponding Australian Patent Application No. 2019400865. (3 pages).

Office Action dated Jul. 4, 2023, by the Canadian Patent Office in corresponding Canadian Patent Application No. 3,124,207. (5 pages).

* cited by examiner

ROBOTIC DEVICE TEST STATION AND METHODS

The present invention relates to a test station for robotic service devices. More specifically but not exclusively, it relates to a self-contained, roller-bed test station for robotic devices of the type used in automated robotic picking systems.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

One form of robotic load handling device is further described in Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Publication No. GB 2,520,104 A1 where each robotic load handler only covers one grid space, thus allowing higher density of load handlers and thus higher throughput of a given size system.

In some implementations of such bin handling systems, there can be a very large number of robotic load handling devices running on a single grid. These load handling devices can experience problems from time to time and require repair or other intervention in order to return to useful service.

Robotic load handling devices may be removed from the grid manually or using robotic service devices as disclosed in UK Patent Publication No. GB 2,525,309 A1.

Removing faulty load handling devices may necessitate stopping some or all the robotic load handlers on the grid depending on the nature of the fault. The higher the number of robotic load handlers in use and the larger the grid, the higher the likelihood of faults occurring and an increased consequence of each fault, due to the number of robotic load handlers which have to be stopped, and removed.

It is an object of the present invention to provide a testing station where robotic devices can be tested to ensure they are functioning correctly prior to deployment on a grid. Such a testing station could also have utility in testing faulty robotic devices which have been removed from a grid, or in the design and development of new types of robotic device.

According to the invention there is provided an automated picking system robotic device testing station comprising: rollers for moving the wheels of a robotic device; and a controller to vary the rotation of the rollers In another aspect the invention provides a method of using the testing station comprising: moving a set of wheels of a robotic device by rotating the rollers.

In a further aspect the invention provides a method of using the testing station comprising engaging the first set of rollers with a first set of wheels of a robotic device; engaging the second set of rollers with a second set of wheels of the robotic device and rotating the first and second set of rollers sequentially or simultaneously.

Preferred features of the invention are defined in the claims.

In this way, the present invention provides a self-contained testing station and methods for testing a range of robotic devices and functions prior to their deployment in an automated picking system to increase the reliability and reduce the overall cost of large bin handling systems.

Figure 1:
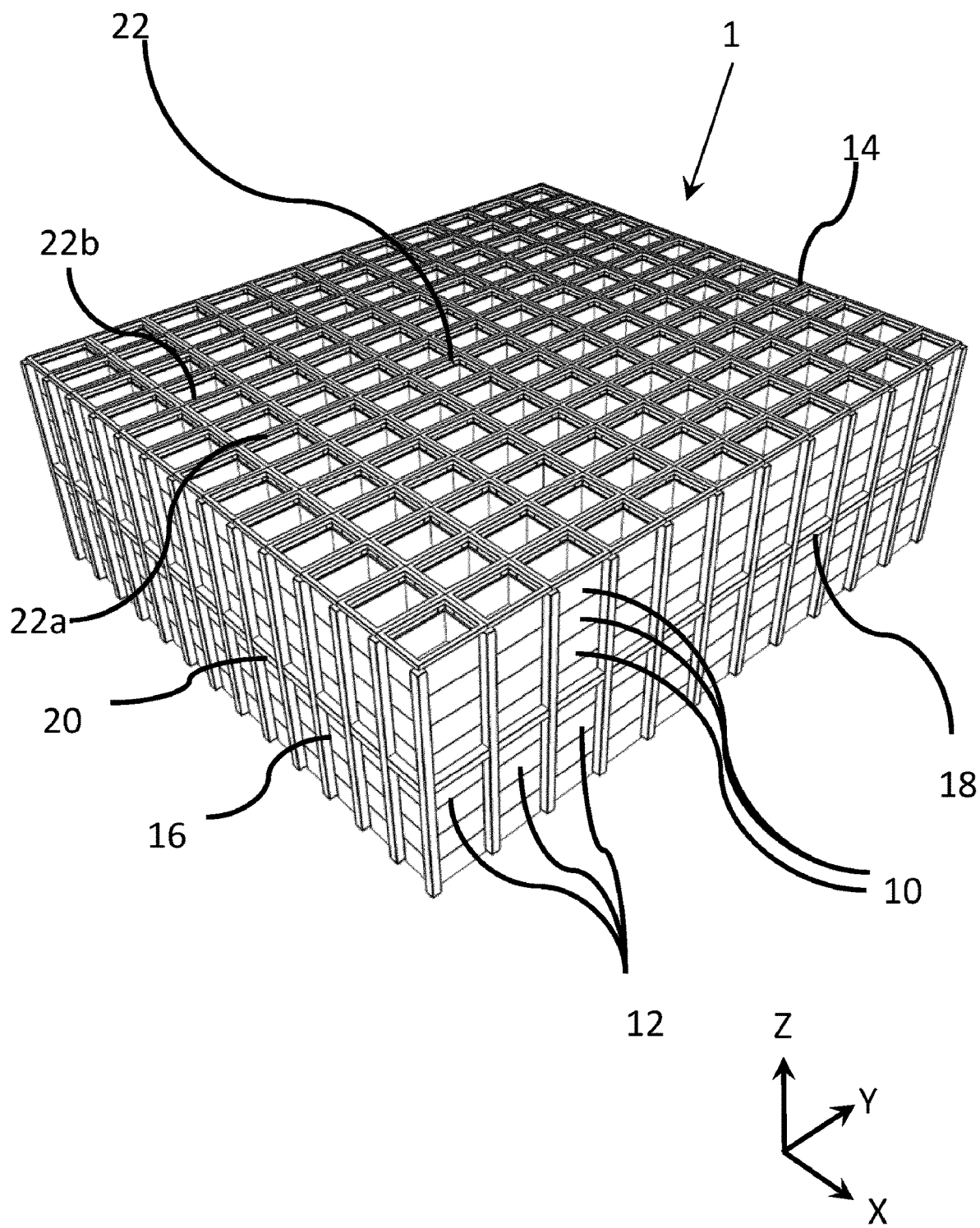
FIG. 1 is a schematic perspective view of a frame structure for housing a plurality of stacks of bins in a known storage system.
Figure 2:
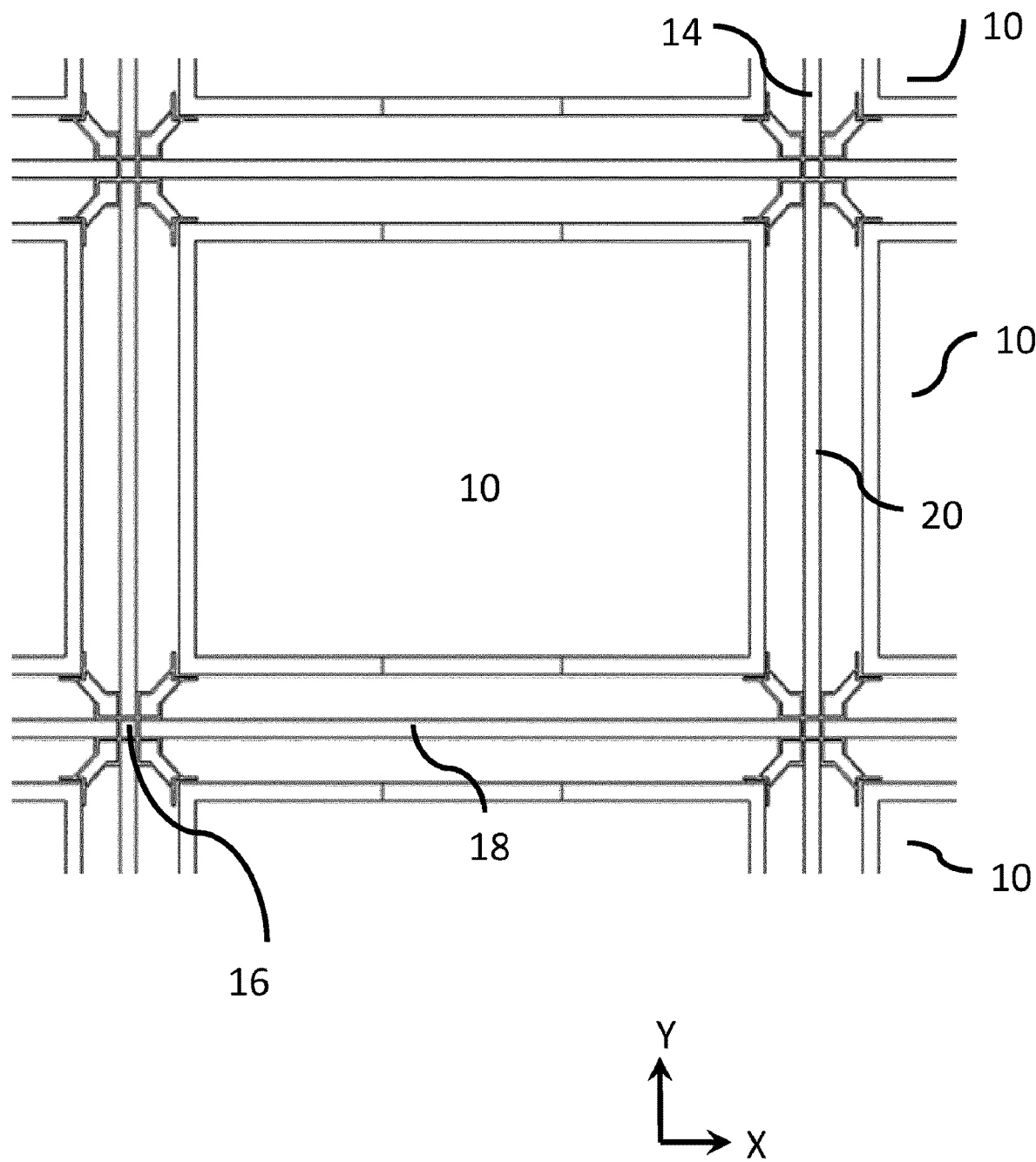
FIG. 2 is a schematic plan view of part of the frame structure of FIG. 1.
Figure 3A:
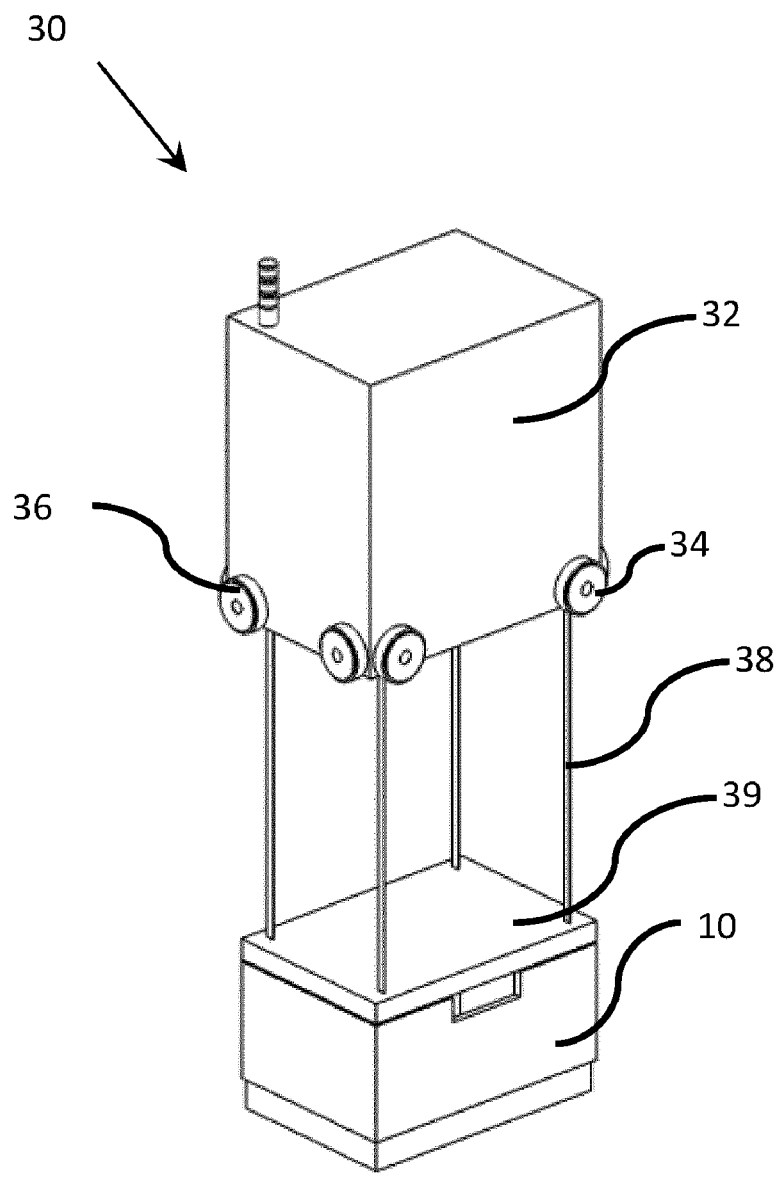
Figures 3B, 3C:
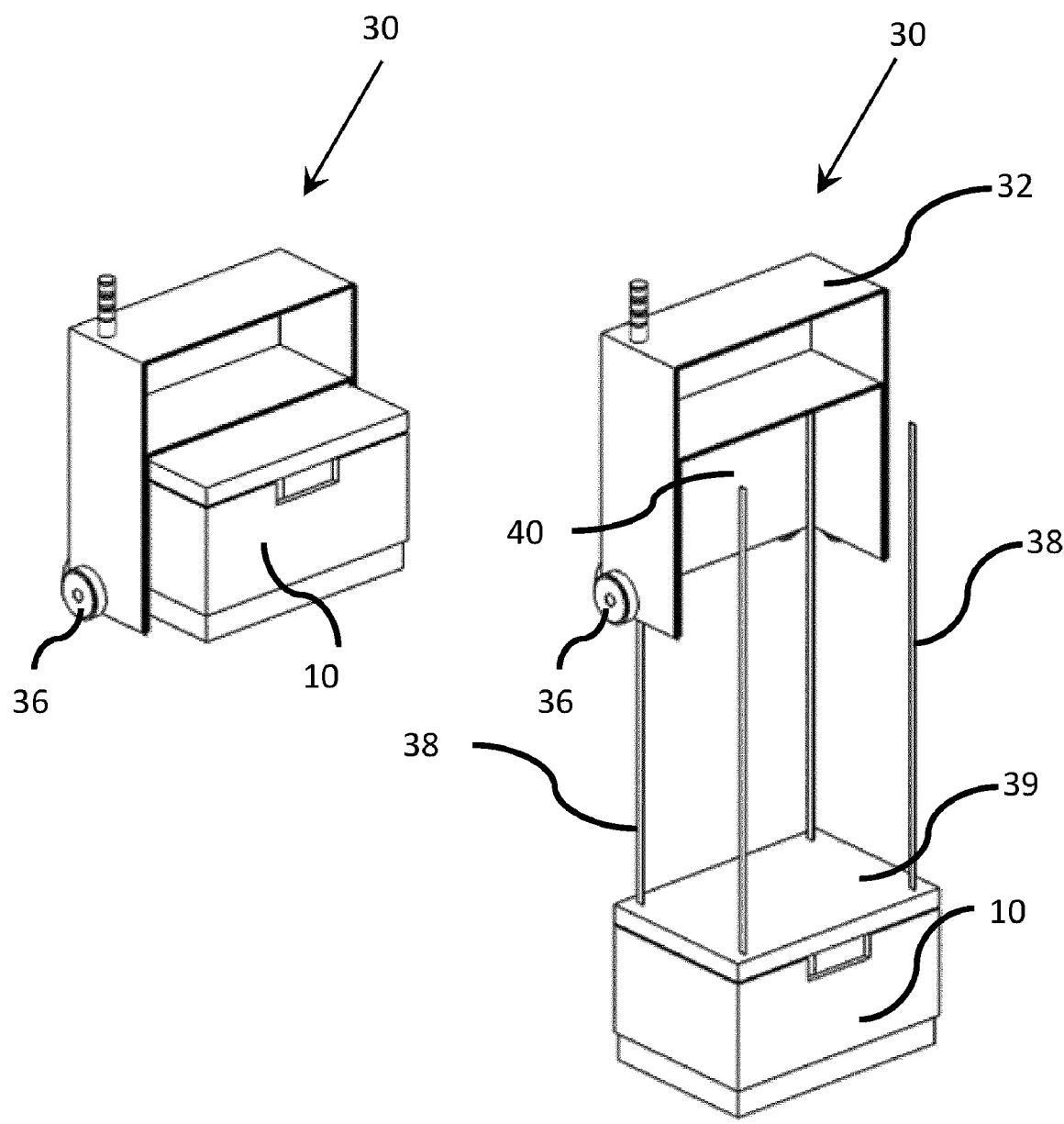
Figure 4:
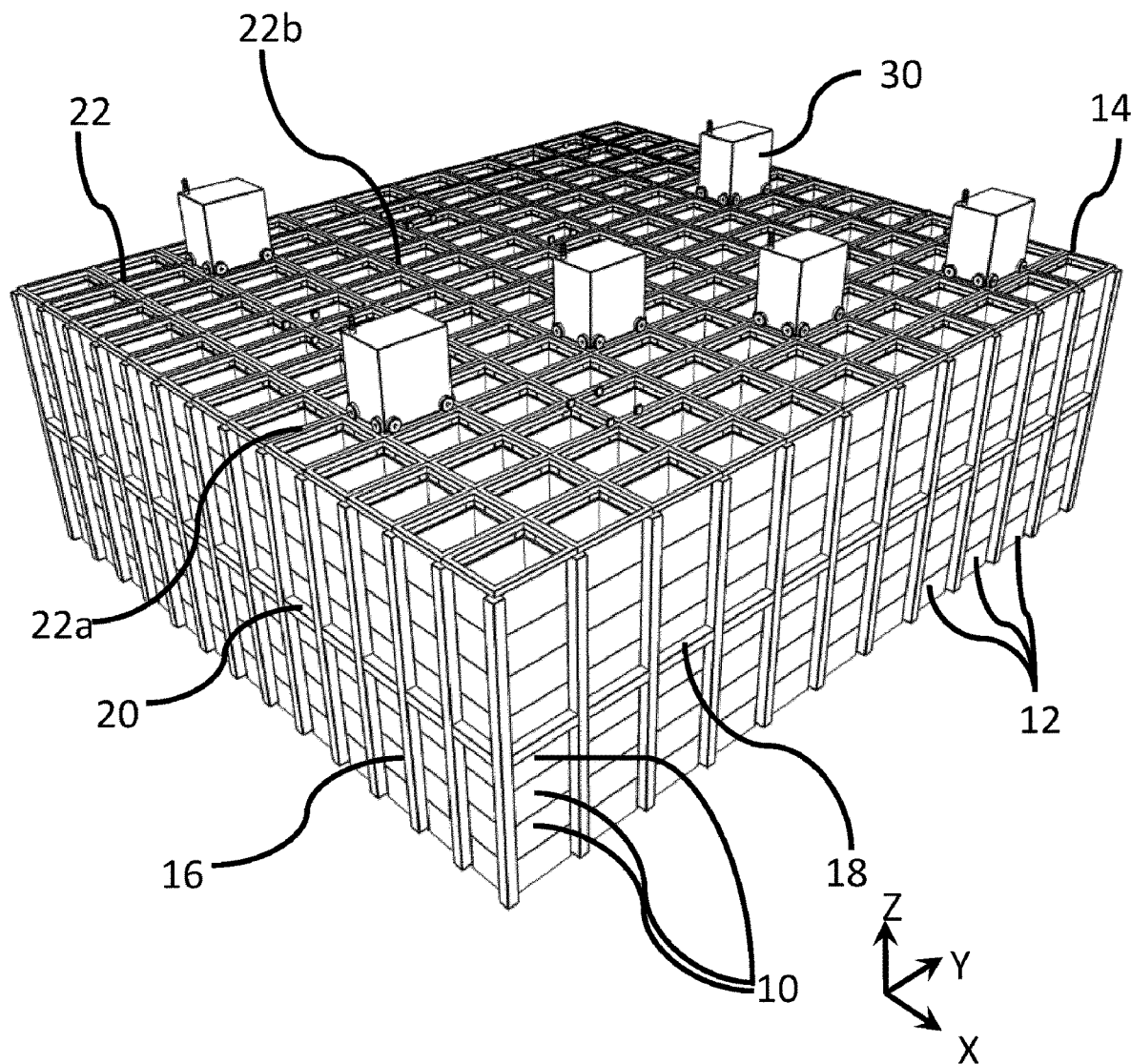
Figure 5:
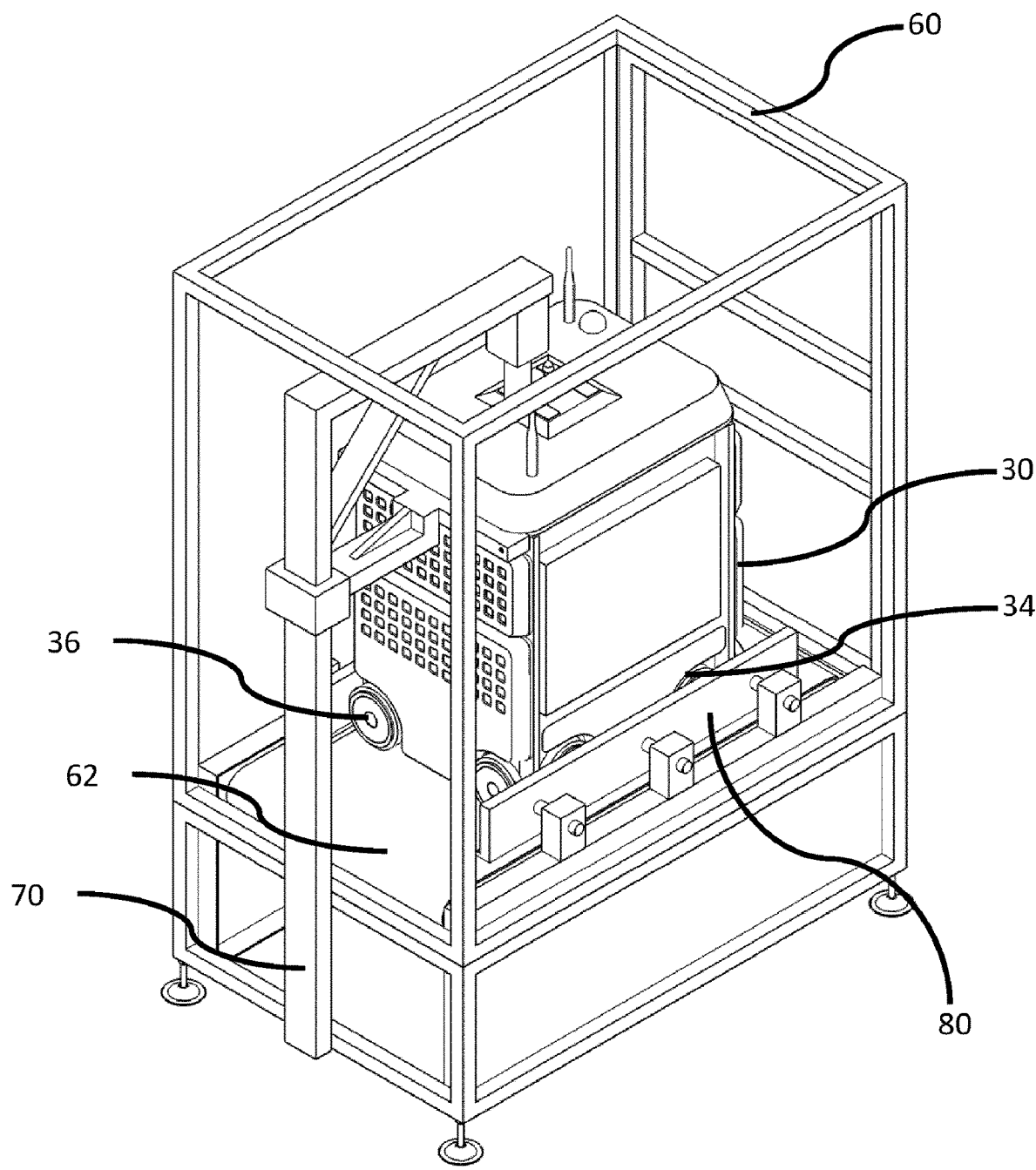
Figure 6:
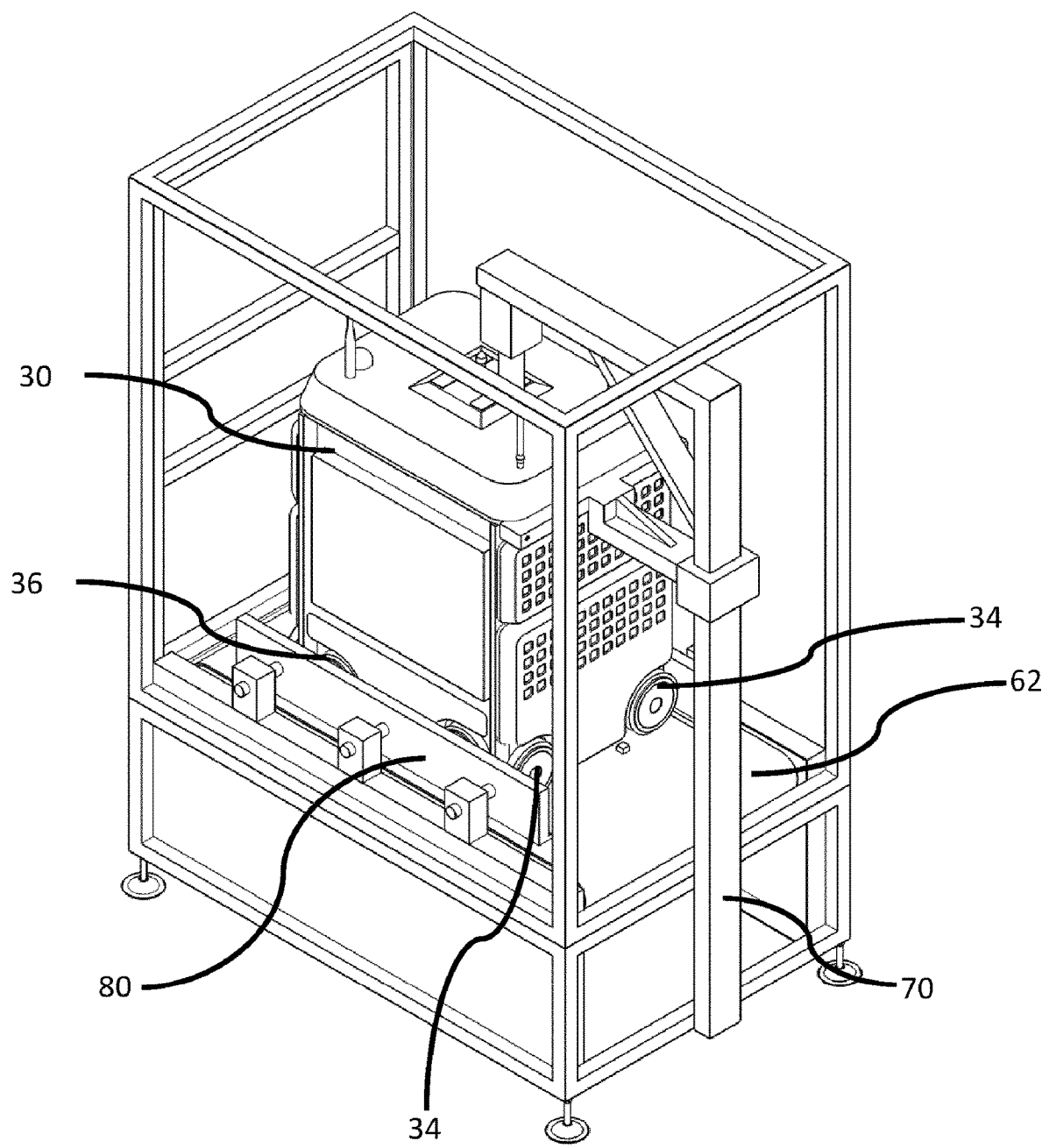
Figure 7:
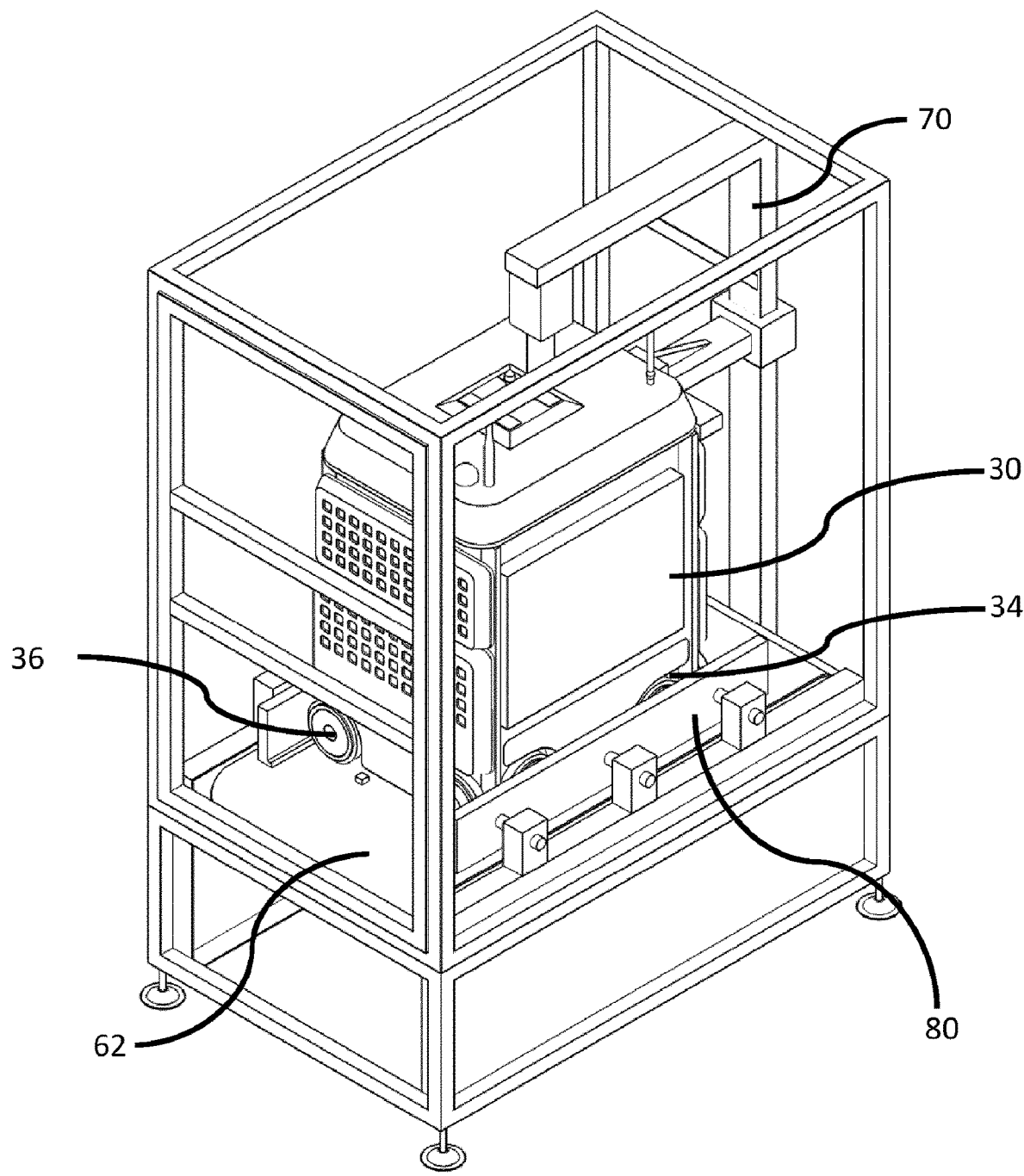
Figure 8:
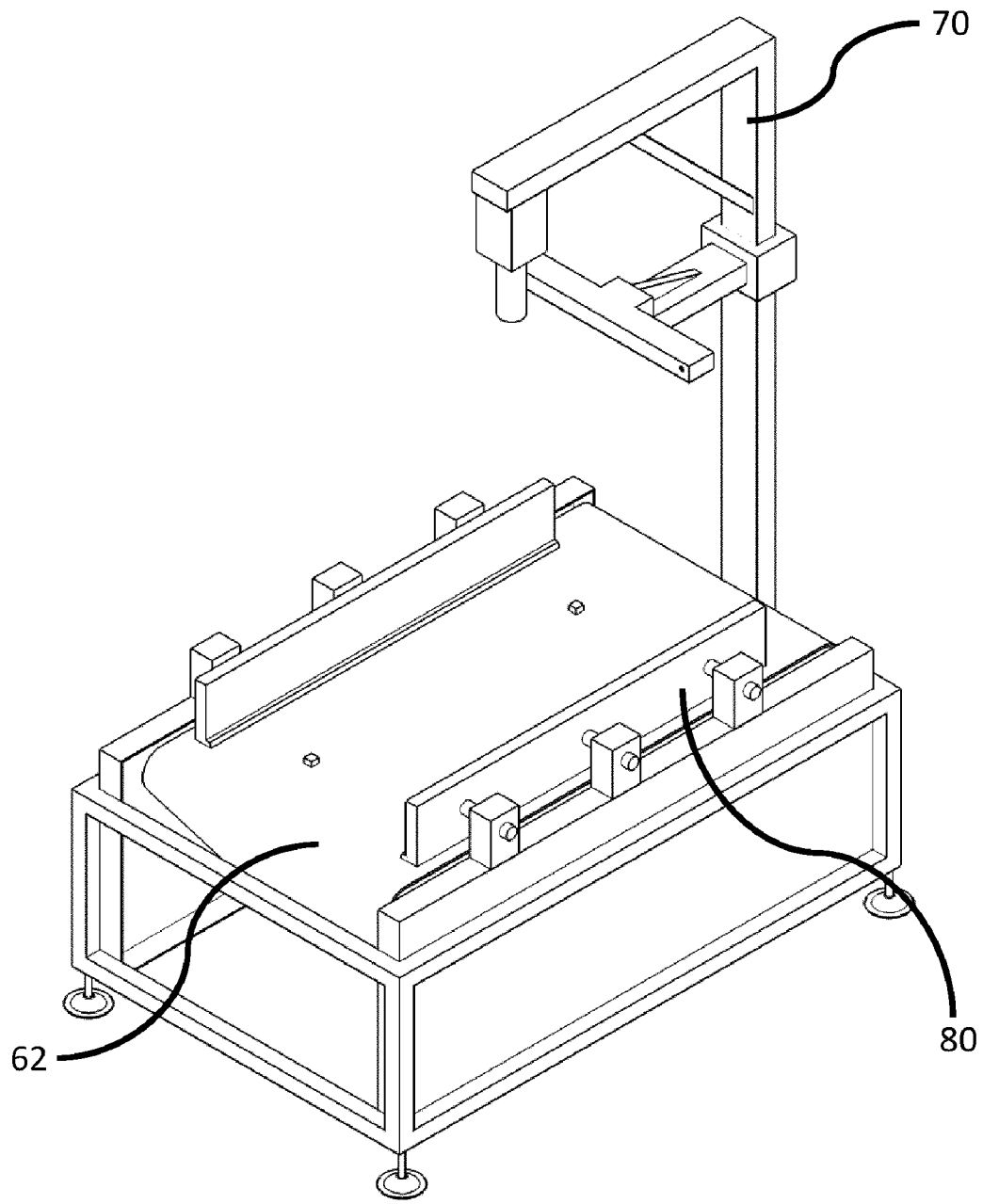

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a bin;

FIG. 4 is a schematic perspective view of a known storage system comprising a plurality of load handler devices of the type shown in FIGS. 3(a), 3(b) and 3(c), installed on the frame structure of FIGS. 1 and 2;

FIG. 5 is a schematic perspective view of a testing station according to the present invention and a load handling device;

FIG. 6 is a further schematic perspective view of the testing station of FIG. 5;

FIG. 7 is a further schematic perspective view of the testing station of FIGS. 5 and 6;

FIG. 8 is a schematic perspective view of an empty testing station according to the present invention.

Figure 9:
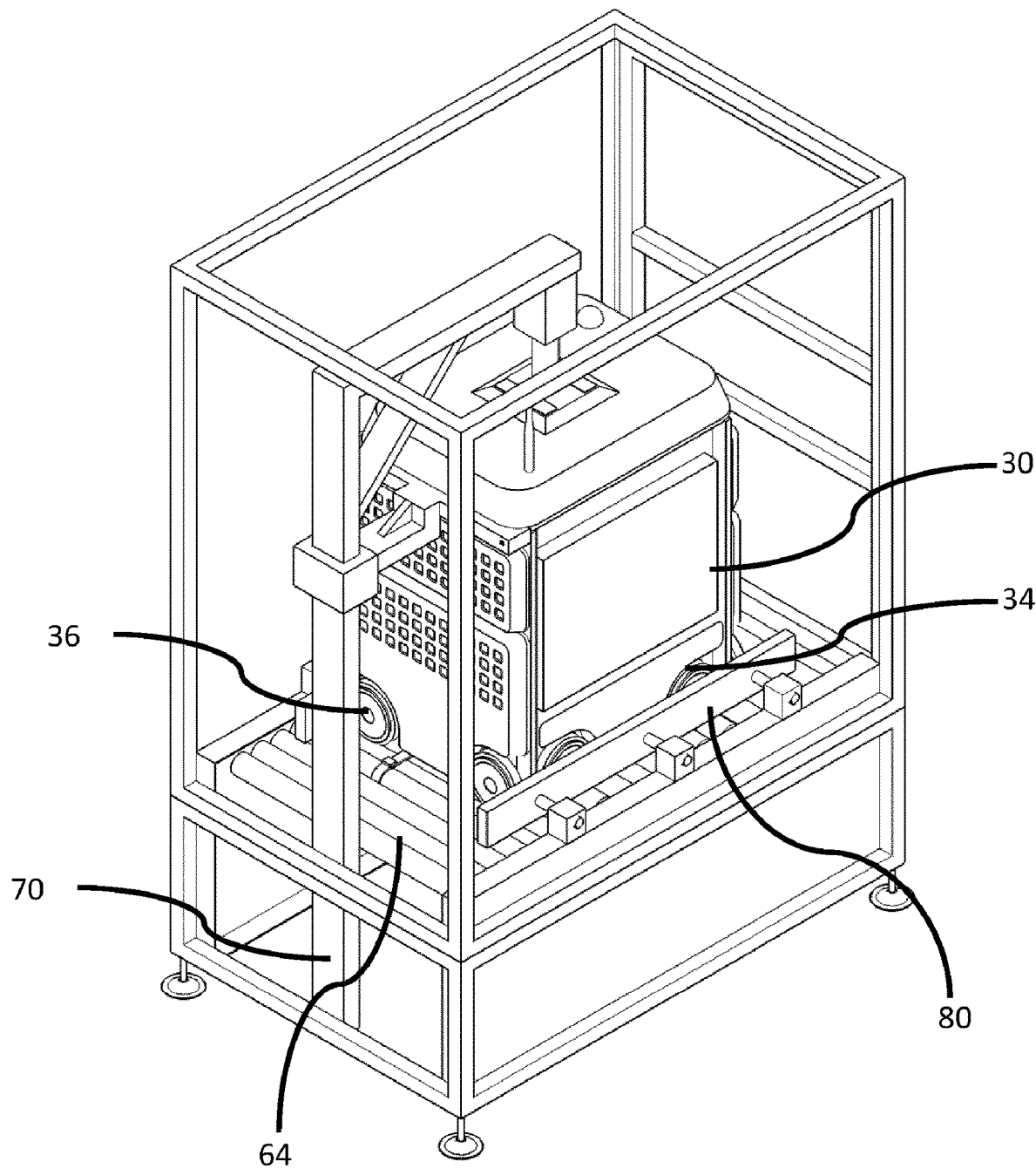

FIG. 9 is a schematic perspective view of an alternative testing station according to the present invention wherein a series of rollers form the moving-bed, and a load handling device.

Figure 10:
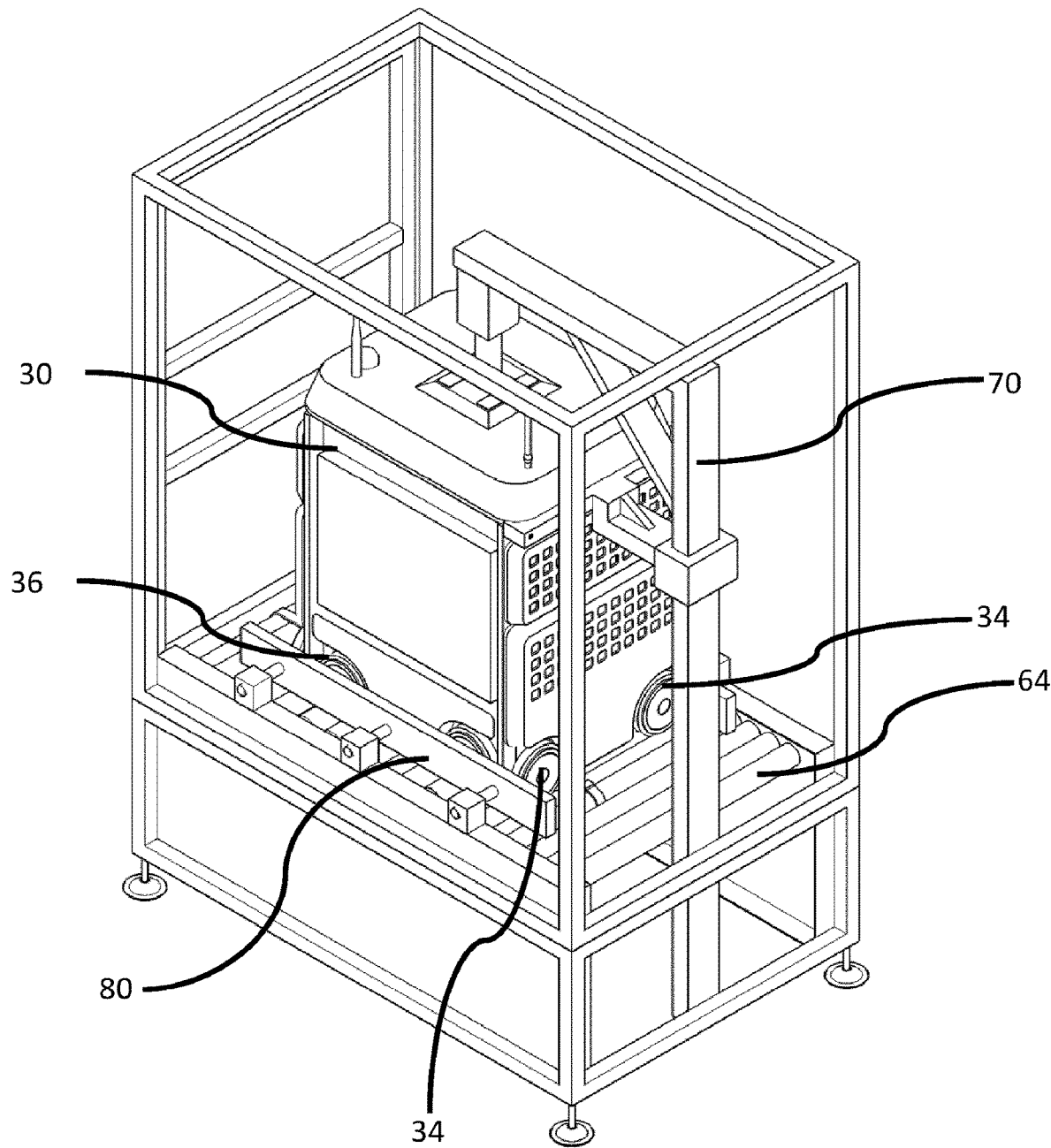
Figure 11:
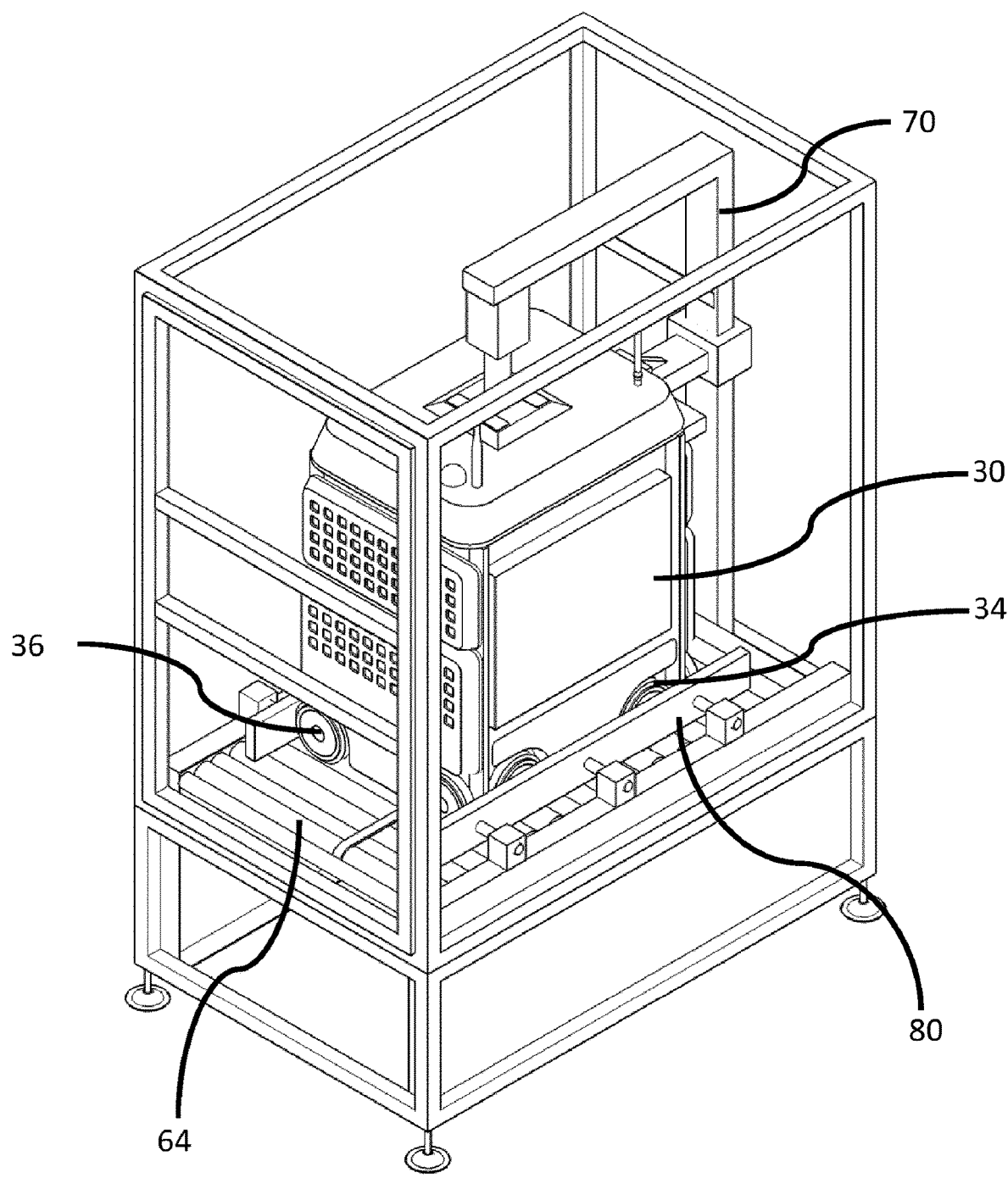
Figure 12:
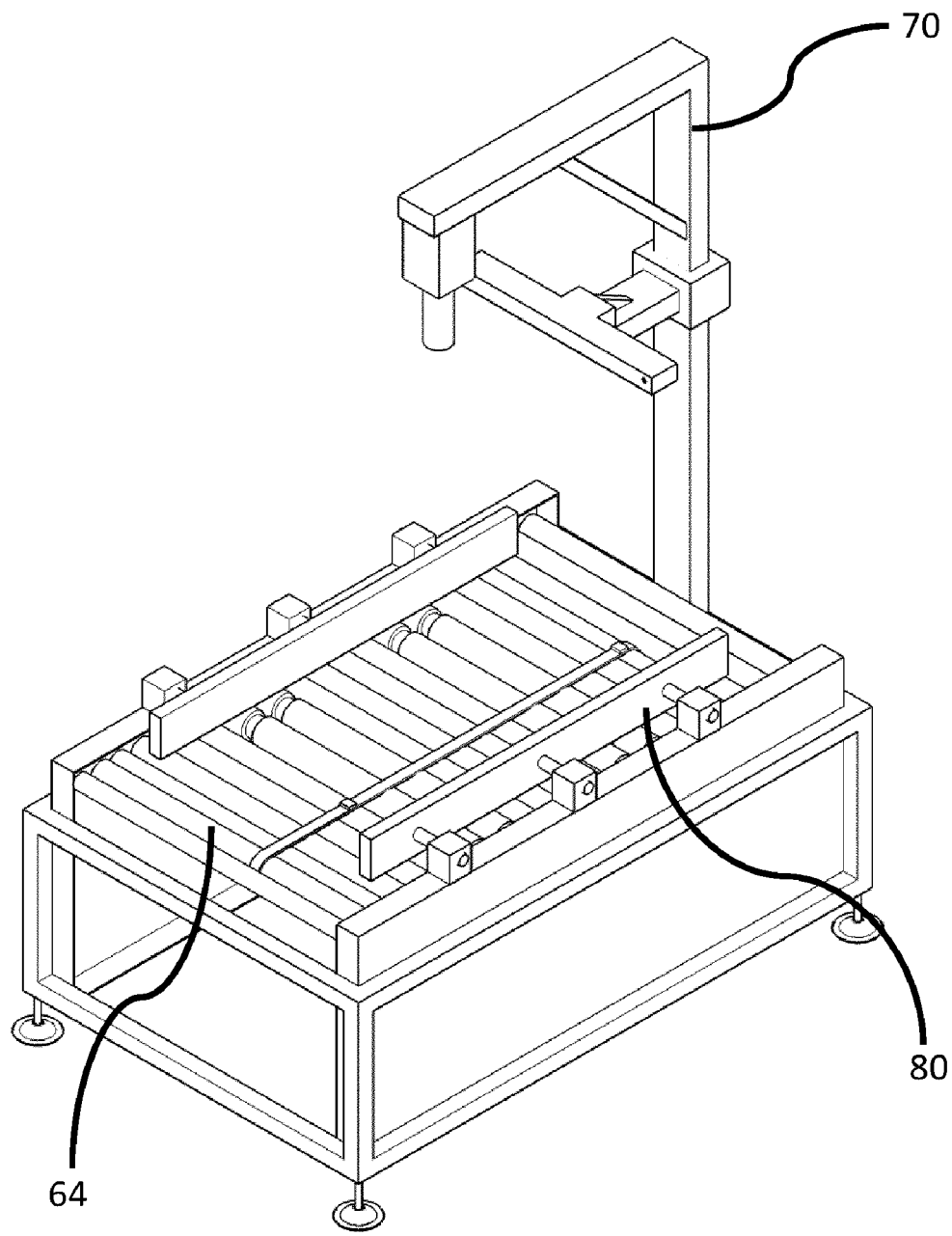

FIG. 10 is an alternative schematic perspective view of the testing station of FIG. 9;

FIG. 11 is an alternative schematic perspective view of the testing station of FIGS. 9 and 10;

FIG. 12 is a schematic perspective view of the testing station shown in FIGS. 9 to 11.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

As shown in FIG. 3 each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means 38, 39, 40 for lifting out one or more bins or containers from the stack to access the required products.

In this way, multiple products can be accessed from multiple locations in the grid and stacks at any one time.

FIG. 4 shows a typical storage system as described above, the system having a plurality of load handling devices 30 active on the stacks 12. In addition, a robotic service device 50 is positioned on the grid 14.

A robotic service device 50 comprises a vehicle 52 which is arranged to travel in the X and Y directions on the rails 22 of the frame structure 14, above the stacks 12. Robotic service devices 50 can provide a range of monitoring, support, assistance, cleaning or servicing functions to the grid, the frame structure 14 or the robotic load handling devices 30. Some robotic service devices 50 can remove a load handling device from the rails 22. Some robotic service devices 50 can remove a load handling device 30 from the grid.

The robotic service device 50 comprises a vehicle 52 having first and second sets of wheels 54, 56 that are engageable with the first and second sets 22a, 22b of rails 22, respectively.

In a similar manner to the operation of the load handling device 30, the first and second sets of wheels 1 of the robotic service device 50 can be moved vertically with respect to the vehicle 50 to engage or disengage the wheels from the corresponding set of rails 22a, 22b. By engaging and driving the appropriate set of wheels the robotic service device 50 can be moved in the X and Y directions in the horizontal plane on the top of the frame structure 14.

One or more robotic service device 50 can be provided to remove one or more load handling device 30 from the grid. The robotic service device 50 is provided with means for releasably latching to a robotic load handling device 30.

The service device 50 may then be used to push or pull the load handling device 30 to remove it from the grid.

Alternatively the service device 50 may be used to lift the load handling device 30 vertically above the rails 22 in the Z direction (perpendicular to the X and Y) with respect to the horizontal plane on the top of the frame structure 14. The service device 50 may then be used to perform maintenance, servicing, inspection, monitoring or other functions to the load handling device within the automated picking system, or to carry the load handling device 30 to remove it from the grid.

It will be appreciated that many forms of load handling device 30 or service device 50 are known or are in development. The test station of the present invention can be used to develop, monitor, test, or diagnose faults in any such robotic device.

A first form of test station will now be described with reference to FIGS. 5 to 12.

Referring to FIG. 5 in a first aspect the test station 60 comprises one or more moving-bed 62 which is sized to accommodate a single robotic device 30.

One or more adjustable retaining arm 70 is provided to position the one or more robotic device on the moving bed 62.

Preferably the one or more moving-bed is sized to permit several robotic devices to be tested simultaneously.

In one aspect shown in FIG. 5, the moving-bed 62 comprises a movable belt which is moved by a pair of rotating rollers as is well known in the art. Movement of the belt moves either the first set of wheels 34, or the second set of wheels 36 of a robotic device depending on the orientation of the robotic device.

In use the first set of wheels 34 are tested as shown in FIG. 5 the robotic device is then rotated 90° with respect to the moving-bed 62 and the second set of wheels 36 are tested.

In another aspect shown in FIG. 9 the moving-bed 62 comprises a series of rollers 64 arranged to engage with the wheels of one or more robotic device.

In another aspect (not shown) two sets of rollers are provided. The first set are arranged to engage with the first set of wheels 34 and the second set are arranged to engage with the second set of wheels 36 of the robotic device either sequentially or simultaneously.

The rollers of the testing station can be moved anticlockwise, clockwise, stopped, started, braked, accelerated, raised, lowered, tilted or otherwise controlled by a controller (not shown) as is well known in the art, to move the wheels 34, 36 of the robotic device to simulate a variety of grid conditions without moving the robotic device.

The surface of the movable belt or the rollers of the testing station can be altered as is well known in the art, such as by way of example only using grease, grit, or oil to alter the friction between the moveable belt or rollers and the wheels 34, 36 of the robotic device to simulate spillages, slippages, jams, overshoots etc.

The size or surface of the moveable belt or rollers may be varied so as to include ridges, bumps or other forms of unevenness to simulate grid junctions or edges.

The separation of the rollers may be varied to provide a change in simulated surface.

In a preferred aspect the testing station is sized to accommodate a load handling device latched to a service device.

As shown in FIGS. 5 to 12 the testing station may be a self-contained unit. Alternatively the testing station may be attached to or within a grid structure.

The load handling devices to be tested are positioned in the testing station manually with or without the aid of lifting equipment 70.

In an alternative aspect (not shown) the testing station may be linked to an automated picking system or a robotic device storage area by rails 22 such that robotic devices can be conveyed to the testing station autonomously or by a service device.

In use the testing station can be used to test a robotic device before it is deployed on the grid of an automated picking system.

The testing station can also be used to design and develop new robotic devices.

The testing station can also be used to test a robotic device which has been retrieved manually, using a service handling device or otherwise from an automated picking system.

A robotic device may be retrieved from an automated picking system for a variety of reasons such as by way of example only for servicing, or cleaning, to test for signs of wear or because it is faulty.

The testing station can be used in a variety of testing protocols such as by way of example only:

Testing may comprise starting and stopping the robotic device wheels.

Testing may comprise moving the robotic device wheels in the X direction.

Testing may comprise moving the robotic device wheels in the Y direction.

Testing may comprise moving the robotic device in the Z direction.

Testing may comprise accelerating wheels of the robotic device.

Testing may comprise decelerating the wheels of the robotic device.

Testing may comprise moving the wheels at the same or at different speeds.

Testing may comprise moving the wheels in the same or in different directions.

Testing may comprise varying the surface of the rollers to simulate grid junctions, jams, overshoots, communications failure, e-stops or emergency stops or the like.

Testing may comprise analysing highly instrumented and with data connector to provide white box feedback of load handling device data.

Testing may further comprise performing one, any, some or all of the above tests either singly or repeatedly or in any combination thereof to simulate a variety of real life or exceptional grid conditions.

The invention claimed is:

1. An automated picking system robotic device testing station for a robotic device having a first set of wheels that is arranged to move the robotic device in an X direction and a second set of wheels that is arranged to move the robot device in a Y direction, the automated picking system robotic device testing station comprising:
   a moving bed for moving wheels of a robotic device; and
   a controller configured to vary a movement of the moving bed and one or more adjustable retaining arms for rotating the robotic device with respect to the moving bed such that the first or the second set of wheels are engageable with the moving bed depending on an orientation of the robotic device on the moving bed.

2. The testing station as claimed in claim 1,
   wherein the moveable belt includes a pair of rollers or a series of rollers arranged to be engageable with the wheels of the robotic device.

3. The testing station as claimed in claim 2, wherein the controller is configured to vary a direction of movement of the moving bed.

4. The testing station as claimed in claim 2, wherein the controller is configured to vary a speed of movement of the moving bed.

5. The testing station as claimed in claim 2, wherein the controller is configured to vary a surface profile of one or more of the rollers or the moveable belt.

6. The testing station as claimed in claim 2, wherein the series of rollers comprises:
   a first set of the two sets of rollers is arranged for engagement with the first set of wheels of the robotic device, and a second set of the two sets of rollers is arranged for engagement with the second set of wheels of the robotic device.

7. The testing station as claimed in claim 2, wherein the rollers are sized to engage with a load handling device latched to a service device.

8. The testing station as claimed in claim 2, wherein the rollers are sized to engage with a load handling device latched to a service device.

9. A method for testing an automatic picking system robotic device, the method comprising:
- engaging a moving bed of a testing station with a first set of wheels of a robotic device;
- rotating the robotic device 90° with respect to the moving-bed; and
- engaging the moving bed of the testing station with a second set of wheels of the robotic device.

10. A method for testing an automatic picking system robotic device, the method comprising:
- rotating a first set of rollers of a moving bed of a testing station;
- engaging the first set of rollers of the moving bed of the testing station with a first set of wheels of the robotic device;
- stopping rotation of the first set of rollers;
- rotating a second set of rollers of the moving bed of the testing station; and
- engaging the second set of rollers of the testing station with a second set of wheels of the robotic device.

* * * * *